US012623405B2

(12) United States Patent
Saul et al.

(10) Patent No.: US 12,623,405 B2
(45) Date of Patent: May 12, 2026

(54) ADDITIVE MANUFACTURING APPARATUS WITH OPTICAL MEANS FOR DIFFUSING/SCATTERING PROJECTED UV LIGHT TOWARDS PHOTOCURABLE RESIN

(71) Applicants: DENTSPLY SIRONA INC., York, PA (US); SIRONA DENTAL SYSTEMS GMBH, Bensheim (DE)

(72) Inventors: Sebastian Saul, Heppenheim (DE); Christoph Brandes, Mannheim (DE)

(73) Assignee: Dentsply Sirona Inc., York, PA (US)

( * ) Notice: Subject to any disclaimer, the term of this patent is extended or adjusted under 35 U.S.C. 154(b) by 120 days.

(21) Appl. No.: 18/729,685

(22) PCT Filed: Jan. 24, 2023

(86) PCT No.: PCT/EP2023/051633
§ 371 (c)(1),
(2) Date: Jul. 17, 2024

(87) PCT Pub. No.: WO2023/156154
PCT Pub. Date: Aug. 24, 2023

(65) Prior Publication Data
US 2025/0162255 A1     May 22, 2025

(30) Foreign Application Priority Data
Feb. 16, 2022     (EP) .................................... 22156974

(51) Int. Cl.
*B29C 64/291*          (2017.01)
*B29C 64/245*          (2017.01)
(Continued)

(52) U.S. Cl.
CPC .......... *B29C 64/291* (2017.08); *B29C 64/245* (2017.08); *B29C 64/307* (2017.08); *B33Y 30/00* (2014.12)

(58) Field of Classification Search
CPC ... B29C 64/277; B29C 64/282; B29C 64/291; B29C 64/286; B29C 64/124; B29C 64/129; B33Y 30/00
See application file for complete search history.

(56) References Cited

U.S. PATENT DOCUMENTS

2016/0176112 A1     6/2016  Liu
2018/0200948 A1*    7/2018  Kuijpers ............... B29C 64/129
(Continued)

FOREIGN PATENT DOCUMENTS

AU          2023221460          6/2024
BR          112024010756        8/2024
(Continued)

OTHER PUBLICATIONS

"International Application Serial No. PCT EP2023 051633, International Search Report mailed Mar. 6, 2023", 4 pgs.
(Continued)

*Primary Examiner* — Yung-Sheng M Tsui
(74) *Attorney, Agent, or Firm* — SCHWEGMAN LUNDBERG & WOESSNER, P.A.

(57) ABSTRACT

The present invention relates to an additive manufacturing apparatus for additively manufacturing a component, including: a resin vat unit which includes: a reservoir for storing UV light photocurable resin; and a UV-transparent window at the bottom of the reservoir, the UV-transparent window includes a UV-transparent plate and a UV-transparent anti-adhesive flexible foil; a projection unit for projecting UV light through the UV-transparent window into the reservoir; a movable building platform having a surface onto which the component can be formed through layerwise curing of said resin. The UV-transparent window further includes: an optical means which is adapted to diffuse the projected UV light towards the building platform into a region (R) where the UV light photocurable resin is to be layerwise cured, the
(Continued)

optical means is arranged in the light path of the projected UV light.

6 Claims, 9 Drawing Sheets

(51) Int. Cl.
    *B29C 64/307*           (2017.01)
    *B33Y 30/00*            (2015.01)

(56)           References Cited

U.S. PATENT DOCUMENTS

| | | | |
|---|---|---|---|
| 2021/0031459 A1 | 2/2021 | Jessen et al. | |
| 2021/0141313 A1 | 5/2021 | De Sugny et al. | |
| 2023/0141628 A1* | 5/2023 | Jeng | B33Y 50/02 |
| | | | 425/140 |
| 2023/0236430 A1* | 7/2023 | Zhu | G02B 27/0927 |
| | | | 264/401 |

FOREIGN PATENT DOCUMENTS

| | | |
|---|---|---|
| CA | 3241100 | 8/2023 |
| CN | 118524923 | 8/2024 |
| EP | 4215343 | 7/2023 |
| EP | 4479238 | 12/2024 |
| JP | 2025506102 | 3/2025 |
| KR | 20240148823 | 10/2024 |
| TW | 201522565 | 6/2015 |
| WO | WO-2017102700 A1 * | 6/2017 | B29C 64/124 |
| WO | 2019124815 | 6/2019 |
| WO | 2020117490 | 6/2020 |
| WO | 2023156154 | 8/2023 |

OTHER PUBLICATIONS

"International Application Serial No. PCT EP2023 051633, Written Opinion mailed Mar. 6, 2023", 7 pgs.

"International Application Serial No. PCT EP2023 051633, International Preliminary Report on Patentability mailed Aug. 29, 2024", 9 pgs.

"European Application Serial No. 23701722.3, Response to Communication pursuant to Rules 1611 and 162 EPC filed Mar. 24, 2025", 8 pgs.

"Australian Application Serial No. 2023221460, First Examination Report mailed May 24, 2025", 4 pgs.

"Australian Application Serial No. 2023221460, Response filed Aug. 1, 2025 to First Examination Report mailed May 24, 2025", 6 pgs.

"Australian Application Serial No. 2023221460, Subsequent Examiners Report mailed Aug. 27, 2025", 5 pgs.

"European Application Serial No. 22156974.2, Extended European Search Report mailed Jul. 28, 2022", 8 pgs.

"European Application Serial No. 22156974.2, Noting of loss of rights pursuant to Rule 1121 EPC mailed Feb. 16, 2024", 2 pgs.

"Australian Application Serial No. 2023221460, Response Filed Oct. 23, 2025 to Subsequent Examiners Report mailed Aug. 27, 2025", 36 pgs.

* cited by examiner 6-4b

2

2′

1

ADDITIVE MANUFACTURING APPARATUS WITH OPTICAL MEANS FOR DIFFUSING/ SCATTERING PROJECTED UV LIGHT TOWARDS PHOTOCURABLE RESIN

CROSS-REFERENCE TO RELATED APPLICATIONS

This is a National Phase application of International Application No. PCT/EP2023/051633 filed on Jan. 24, 2023, which claims the benefit of and priority to European Application Ser. No. 22156974.2, filed on Feb. 16, 2022, which are herein incorporated by reference for all purposes.

TECHNICAL FIELD OF THE INVENTION

The present invention relates to an additive manufacturing apparatus for additively manufacturing 3D components such as dental restorations and dental appliances.

BACKGROUND OF THE INVENTION

In additive manufacturing techniques, such as stereo-lithography (SLA) or digital light processing (DLP), a 3D (three-dimensional) component is printed layer-by-layer through light-based curing of a liquid printing medium i.e., a photocurable resin, which is selectively cured under the influence of UV radiation. The photocurable resin can become finally transparent or non-transparent/colored after the curing/polymerization process depending on the type of the photocurable resin material used. In a commonly known variation of additive manufacturing, the 3D components are preferably pulled by means of a building platform, upside-down out of the photocurable resin in a resin vat. Other variations of additive manufacturing are also known to those skilled in the art.

FIG. 2 illustrates a comparative example in which the right-hand side shows a vertical cross-sectional partial view of an additive manufacturing apparatus according to the prior art. The prior art additive manufacturing apparatus comprises: a resin vat unit (3) which comprises a reservoir (4') for storing UV light photocurable resin (5'), and a UV-transparent window (6-4') at the bottom of the reservoir (4'), wherein said UV-transparent window (6-4') includes a UV-transparent plate (6-4a') and a UV-transparent anti-adhesive flexible foil (6-4b); a projection unit (7') for projecting UV light (8') through the UV-transparent window (6-4') into the reservoir (4'); and a movable building platform (9') having a surface (9a') onto which a 3D component can be produced through layerwise curing of the said resin (5").

A problem with the prior art additive manufacturing apparatus in FIG. 2 is that the printed 3D components subsequently require mechanical surface treatment such as polishing, grinding for obtaining a smooth surface. In general, dental restorations and appliances can't be used directly after 3D printing without such mechanical surface treatment being applied as it would cause an unpleasant sensation to the user. Therefore, the prior art has the disadvantages that additional staff, working hours, and consumables are required for the mechanical surface treatment of the printed 3D components, and thus all these incur respective costs. Furthermore, when the 3D component is printed from a transparent photocurable resin, this results in a translucent 3D component because of the rough surface which affects the light transmission and causes a certain degree of opacity. However, 3D components such as dental aligners need to be clear to give a natural impression. Therefore, also some mechanical surface treatment is usually required to remove the opacity.

FIG. 10B illustrates a comparative example in which a 3D component (2') has been printed using a transparent photo-curable resin through an additive manufacturing apparatus according to the prior art. In this comparative example, the 3D component (2') has not been subjected to any mechanical surface treatment. The eagle in the background illustrates that the 3D component (2') has a certain opacity because of the rough surface.

FIG. 11C illustrates another comparative example in which a dental aligner (2a') has been printed using a transparent photocurable resin through an additive manu-facturing apparatus according to the prior art. Also, in this comparative example the aligner (2a') has not been sub-jected to any mechanical surface treatment and has been directly placed on a denture model (D). It can be seen that the aligner (2a') has a certain opacity because of the rough surface, and the teeth cannot be clearly seen.

In the prior art, anti-aliasing software is commonly used to improve edge-smoothness so that any mechanical surface treatment can be omitted. In principle, such anti-aliasing software is based on the use of 2D/3D digital filters which are commonly known in the art. However, the prior art has the disadvantages that anti-aliasing software increases the computational costs and is also limited by the geometry and magnification of the light source such as laser point diameter or pixel size. These physical limitations reduce the practical effects that can be achieved with it.

SUMMARY OF THE INVENTION

The inventors are not aware of any additive manufactur-ing apparatus technology in which an optical means for diffusing/scattering the projected UV light towards the UV light photocurable resin (5), for example, a milky foil and/or a milky plate is used to manufacture components with an improved smoothness and transparency to visible light.

An objective of the present invention is to overcome the above-mentioned problems of the prior art and to provide an additive manufacturing apparatus which enables the printing of 3D components with an improved smoothness and trans-parency to visible light such that any mechanical surface treatment and software based anti-aliasing can be dispensed with.

The present invention provides an additive manufacturing apparatus for additively manufacturing a 3D component. The additive manufacturing apparatus comprises: a resin vat unit which comprises: a reservoir for storing UV light photocurable resin; and a UV-transparent window at the bottom of the reservoir, wherein said UV-transparent win-dow includes a UV-transparent plate and a UV-transparent anti-adhesive flexible foil; a projection unit for projecting UV light through the UV-transparent window into the res-ervoir; a movable building platform which has a surface onto which said 3D component can be formed through layerwise curing of said resin. The UV-transparent window further comprises an optical means which is adapted to diffuse the projected UV light towards the building platform into the region where the UV light photocurable resin is to be layerwise cured, wherein the said optical means is arranged in the light path of the projected UV light.

A major advantageous effect of the present invention is that through the said optical means the projected UV light can be diffused and thus the polymerization of the photo-curable resin in the proximity of the adjacent pixels at an edge site becomes smoother. Thereby, also the overall scattering of the visible light throughout the printed 3D component can be reduced so that any opacity due to the roughness of the surface can be prevented especially when the 3D component has been printed with transparent photocurable resin material. Another major advantageous effect of the present invention is that the need for any mechanical surface treatment after the printing or any software-based anti-aliasing during the printing can be dispensed with, and thus the printed 3D components, for example, dental restorations and appliances such as clear aligners can be directly and immediately used by the patient while giving a pleasant sensation and having a clear appearance. Another major advantageous effect of the present invention is that the costs, processing time, consumables for the mechanical surface treatment can be saved. Still another major advantageous effect of the present invention is that the costs and processing time for the computational effort for the software-based anti-aliasing can be also saved.

The above-described optical means may be realized through frosting the surfaces of the UV-transparent anti-adhesive flexible foil or the surfaces of the UV-transparent plate, or by adding light diffusing/scattering particles into the said foil or the said plate, or by using matrices of microlenses, or similar structures or mechanisms for diffusing the projected UV light. Thereby a milky foil and/or plate can be obtained.

In one embodiment, at least one of the upper surfaces and the lower surface of the UV-transparent anti-adhesive flexible foil is frosted. Thus, the frosted surface of the UV-transparent anti-adhesive flexible foil can diffuse the projected UV light towards the photocurable resin and lead to a smoothening between the adjacent pixels to be cured. In an alternative embodiment, the UV-transparent anti-adhesive flexible foil includes light diffusing/scattering particles. The light diffusing/scattering particles can be introduced into the UV-transparent anti-adhesive flexible foil during its manufacturing by adding small impurities or cavities. The projected UV light can be additionally or alternatively actively diffused by using liquid crystal or electrochromate glass.

In another alternative embodiment, at least one of the upper surfaces and the lower surface of the UV-transparent plate is frosted. Thus, the frosted surface of the UV-transparent plate can diffuse the projected UV light towards the photocurable resin and lead to a smoothening between the adjacent pixels to be cured. In another alternative embodiment, the UV-transparent plate includes light diffusing/scattering particles. The light diffusing/scattering particles can be introduced into the UV-transparent plate during its manufacturing by adding small impurities or cavities.

In another alternative embodiment the optical means is realized through a matrix of light diffusing microlenses. Such a matrix can be produced as a separate transparent foil with 2D arrays of microlenses. The 2D array of microlenses can be placed below the UV-transparent anti-adhesive flexible foil, and further either above or below the UV-transparent plate. The 2D array of microlenses can be integrally provided with the UV-transparent plate or the UV-transparent anti-adhesive flexible foil.

According to the present invention it is also desired that the additive manufacturing apparatus can be retrofitted/equipped with the said optical means for diffusing the projected UV light. Therefore, in an embodiment, the resin vat unit is provided as a detachable unit which can be entirely removed from the additive manufacturing apparatus to allow exchanging the existing resin vat unit with another resin vat unit that includes the said optical means. Thus, the user can selectively attach a resin vat unit with any of the desired optical means as described above for achieving printing with smooth surfaces. Furthermore, in another embodiment the detachable resin vat unit is preferably provided with an RFID tag that includes information on the presence/absence of the said optical means in the UV-transparent window. In this embodiment, the additive manufacturing apparatus is provided with an RFID reader/writer. Thereby the additive manufacturing apparatus can recognize that the attached resin vat unit comprises such optical means, inform the user and apply the required printing mode. Alternatively, the user may enter via the user interface prior to the printing process the type of the resin vat unit attached. Alternatively, other sensing elements commonly known in the art can be used instead of the RFID tag.

According to the present invention it is also desired that the resin vat unit can be retrofitted/equipped with the optical means for diffusing the projected UV light. Thereby, depending on the desired target transparency of the 3D component, the degree of diffusion through the optical means can be pre-adjusted. In addition, if the resin vat has an RFID tag, this can be further updated via the user interface by means of the RFID reader/writer after the retrofitting. Alternatively, a new appropriate RFID tag can be attached to the resin vat unit. According to the present invention the UV-transparent anti-adhesive flexible foil with the one or more frosted surfaces, or with the light diffusing particles, or with the micro lens array can be also separately provided to the user for retrofitting the resin vat unit for the purpose of smoothening the surface of the 3D printed components. Therefore, in an embodiment, the UV-transparent anti-adhesive flexible foil with the UV light diffusing optical means can be removably mounted to a frame assembly of the resin vat unit. Thereby the user can exchange a prior art UV-transparent anti-adhesive flexible foil with the UV-transparent anti-adhesive flexible foil having the UV light diffusing optical means or vice versa in accordance with the printing requirements. In another alternative embodiment, the user can exchange by means of the frame assembly a prior art UV-transparent plate with the UV-transparent plate having the UV light diffusing optical means or vice versa in accordance with the printing requirements. In another alternative embodiment, an additional transparent foil with micro lens arrays can be mounted into the frame assembly. The resin vat unit can be also provided as a unit which is partly integrated with the additive manufacturing apparatus.

BRIEF DESCRIPTION OF THE DRAWINGS

In the subsequent description, further aspects and advantageous effects of the present invention will be described in more detail by using exemplary embodiments and by referring to the drawings, wherein.

DETAILED DESCRIPTION OF THE INVENTION

Figure 1:
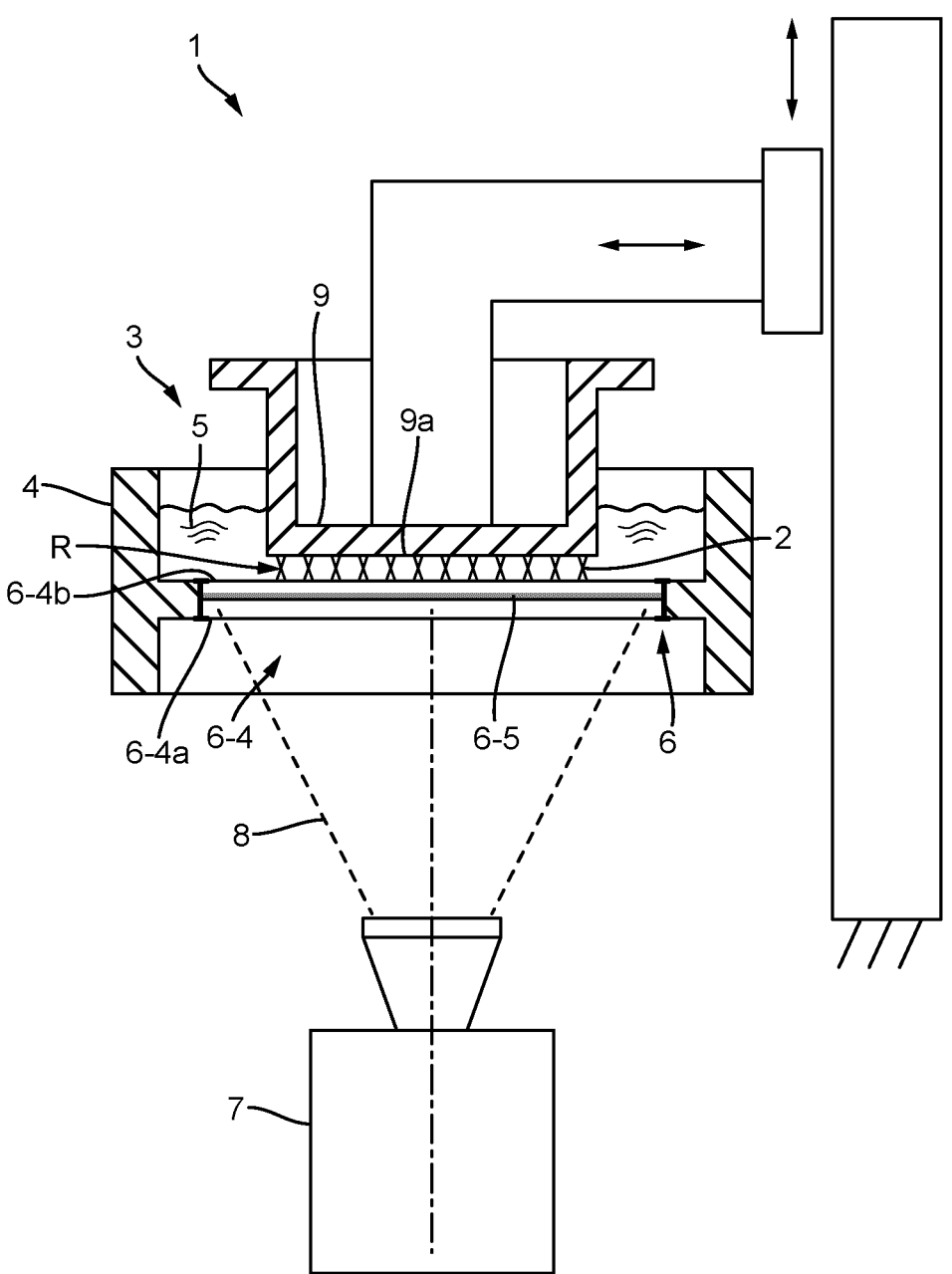
FIG. 1—is a schematic vertical cross-sectional partial view of an additive manufacturing apparatus according to an embodiment of the present invention.

The reference numbers shown in the drawings denote the elements as listed below and will be referred to in the subsequent description of the exemplary embodiments.

1. Additive manufacturing apparatus
    2. 3D Component
        2*a*. Dental aligner
    3. Resin vat unit
    4. Reservoir
        4*a*. Aperture
        4*b*. Grip
    5. UV light photocurable resin
    6. Frame assembly
        6-1. Inner frame
            6-1*a*. Inner frame element
            6-1*b*. Inner frame element
            6-1*c*. Screw
            6-1*d*. Screw hole
        6-2. Outer frame
            6-2*a*. Air hole
            6-2*b*. Air channel
            6-2*c*. Hose
            6-2*d*. Screw
            6-2*d'*. Screw
            6-2*e*. Screw hole
            6-2*e'*. Screw hole
        6-3. Sealing
        6-4. UV-transparent window
            6-4*a*. UV-transparent plate
            6-4*b*. UV-transparent anti-adhesive flexible foil
        6-5. Optical means (diffuser)
    7. Projection unit
    8. UV light
    9. Movable building platform
        9*a*. Surface
    D: Denture Model FIG. 1 shows an embodiment of an additive manufacturing apparatus (1) for additively manufacturing a 3D component (2). The additive manufacturing apparatus (1) has a resin vat unit (3) which includes a reservoir (4) for storing UV light photocurable resin (5), and a frame assembly (6) which holds a UV-transparent window (6-4) at the bottom of the reservoir (4). The reservoir (4) may be heated to proper operating temperature by means of a heater (not shown). The UV-transparent window (6-4) includes a UV-transparent plate (6-4*a*) and a UV-transparent anti-adhesive flexible foil (6-4*b*). The UV-transparent plate (6-4*a*) is preferably a glass plate. Alternatively, a PMMA plate can be used. Furthermore, the additive manufacturing apparatus (1) has a projection unit (7) for projecting UV light (8) through the UV-transparent window (6-4) into the reservoir (4). The additive manufacturing apparatus (1) includes a transportation unit comprising a movable building platform (9) that has a surface (9*a*) facing the bottom of the resin vat unit (3) onto which said 3D component (2) can be formed through layerwise curing of said resin (5) through the projection unit (7). The building platform (9) can be moved into and out of the reservoir (4) for layer-wise curing, and for peeling off the cured layer from the foil (6-4*b*). The building platform (9) can be also moved sideways within the reservoir (4) by the transportation unit. The additive manufacturing apparatus (1) also comprises a computer-implemented control unit (not shown) for controlling the overall operation, including controlling the projection unit (7) and the transport unit. The UV-transparent window (6-4) further comprises an optical means (6-5) which is adapted to diffuse the projected UV light (8) towards the building platform (9) into the region (R) where the UV light photocurable resin (5) is to be layerwise cured. The optical means (6-5) is arranged in the light path of the projected UV light (8).

Figure 2:
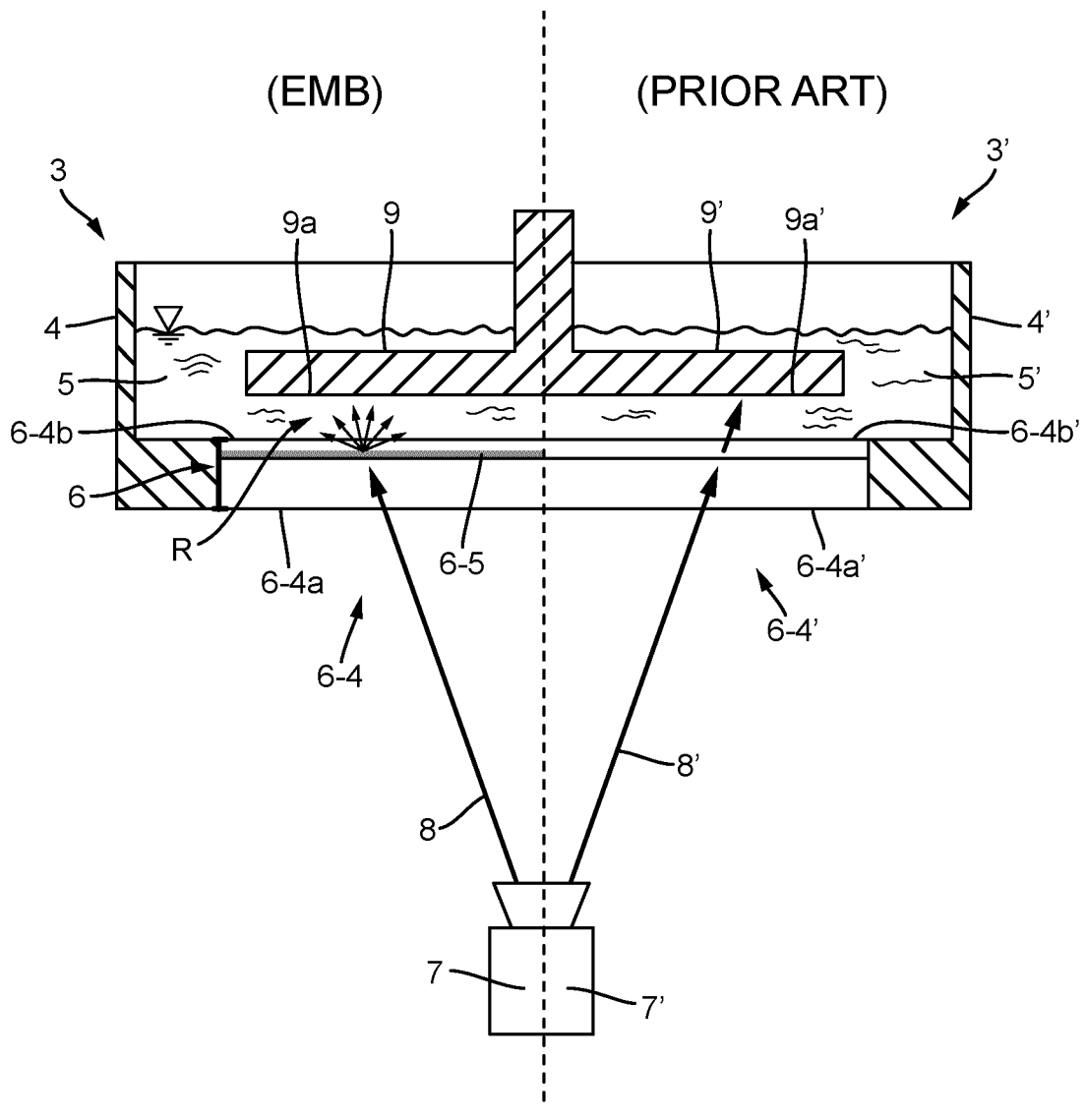
FIG. 2—is a schematic comparative example showing a vertical cross-sectional partial view of an additive manufacturing apparatus according to an embodiment (see EMB) and a vertical cross-sectional partial view of an additive manufacturing apparatus according to the prior art in a side by side arrangement for comparison.

The working principle of the additive manufacturing apparatus (1) will be explained in more detail with reference to the comparative example in FIG. 2 which illustrates a schematic side by side arrangement of the additive manufacturing apparatus according to the embodiment in FIG. 1 and an additive manufacturing apparatus according to the prior art. As can be seen on the left-hand side of FIG. 2, the optical means (6-5) (illustrated through the grey/milky region) diffuses the projected UV light such that the photocurable resin (5) in the proximity of the adjacent pixels onto which the diffuse UV light impinges is polymerized more smoothly. Thus, the curing process through the diffused UV light has an anti-aliasing effect. As can be seen on the right-hand side of FIG. 2, the UV-transparent anti-adhesive flexible foil (6-4*b*) has no diffusing effect. This results in a rough surface where the cured pixels form sharp edges.

Figure 3:
FIG. 3—is a schematic perspective view of an entirely detachable resin vat unit of the additive manufacturing apparatus according to an embodiment.

In alternative embodiments of the present invention, the said optical means (6-5) can be realized through frosting the upper surface and/or the lower surface of the UV-transparent anti-adhesive flexible foil (6-4*b*). FIG. 3 shows an embodiment in which only a lower surface of the UV-transparent anti-adhesive flexible foil (6-4*b*) has been frosted. Herein it is to be understood that the lower surface faces the projection unit (7) and is averted from the interior of the reservoir (4) such that it does not contact the photocurable resin (5). In the embodiment of FIG. 3, the upper surface of UV-transparent anti-adhesive flexible foil (6-4*b*) is smooth, thus not frosted in order to easily allow the peeling-off of the said flexible foil (6-4*b*) from the 3D component (2) attached to the surface (9*a*) of the movable building platform (9). During the printing process, each time after a layer has been polymerized through the projected UV light, the peeling-off can be achieved by an upward/downward movement of the building platform (9) so that new photocurable resin (5) can refill in the gap between the 3D component (2) and the UV-transparent anti-adhesive flexible foil (6-4*b*) on the bottom of the reservoir (4) for printing the next layer. Alternatively, both of the upper surface and lower surface, or only the upper surface of UV-transparent anti-adhesive flexible foil (6-4*b*) may be frosted.

In another alternative embodiment (not shown) of the present invention, the optical means (6-5) can be realized through providing light diffusing/scattering particles into the UV-transparent anti-adhesive flexible foil (6-4*b*). Also, in this embodiment it is preferable that the upper surface of UV-transparent anti-adhesive flexible foil (6-4*b*) including the light diffusing/scattering particles is smooth (not frosted) for enabling an easy peeling-off. Alternatively, the upper surface and/or the lower surface of the UV-transparent anti-adhesive flexible foil (6-4*b*) having the light diffusing/scattering particles may be additionally frosted.

In other alternative embodiments (not shown) of the present invention, the said optical means (6-5) can be realized through frosting the upper surface and/or the lower surface of the UV-transparent plate (6-4*a*), and/or by including light diffusing/scattering particles in the UV-transparent plate (6-4*a*). In the embodiment shown in FIG. 4, the UV-transparent plate (6-4*a*) is totally transparent, thus not frosted and is provided without light diffusing/scattering particles.

Figure 4:
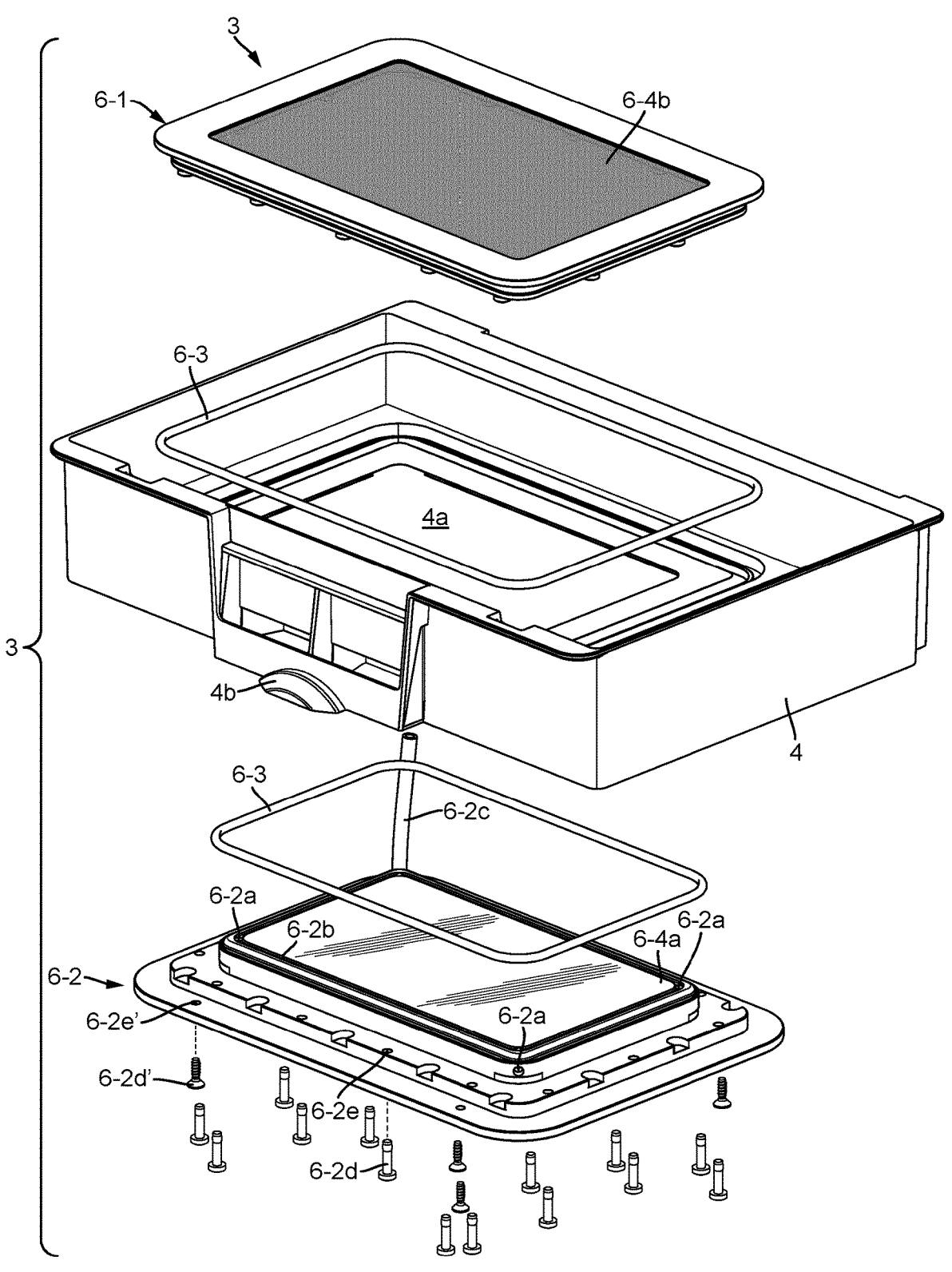
FIG. 4—is a schematic perspective exploded view of the resin vat unit in FIG. 3.
Figure 5:
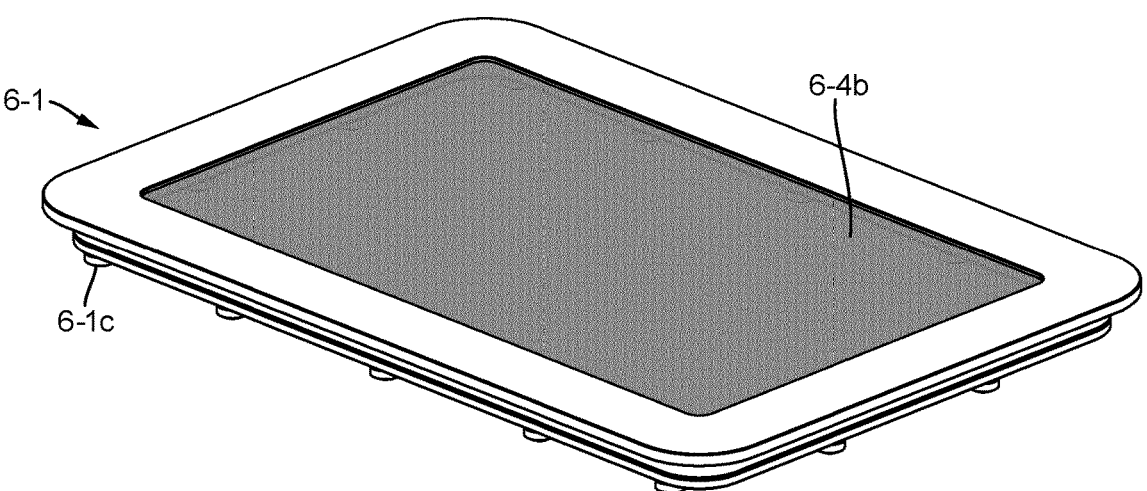
FIG. 5—is a schematic perspective top view of an inner frame of the frame assembly of the resin vat unit in FIG. 4.
Figure 6:
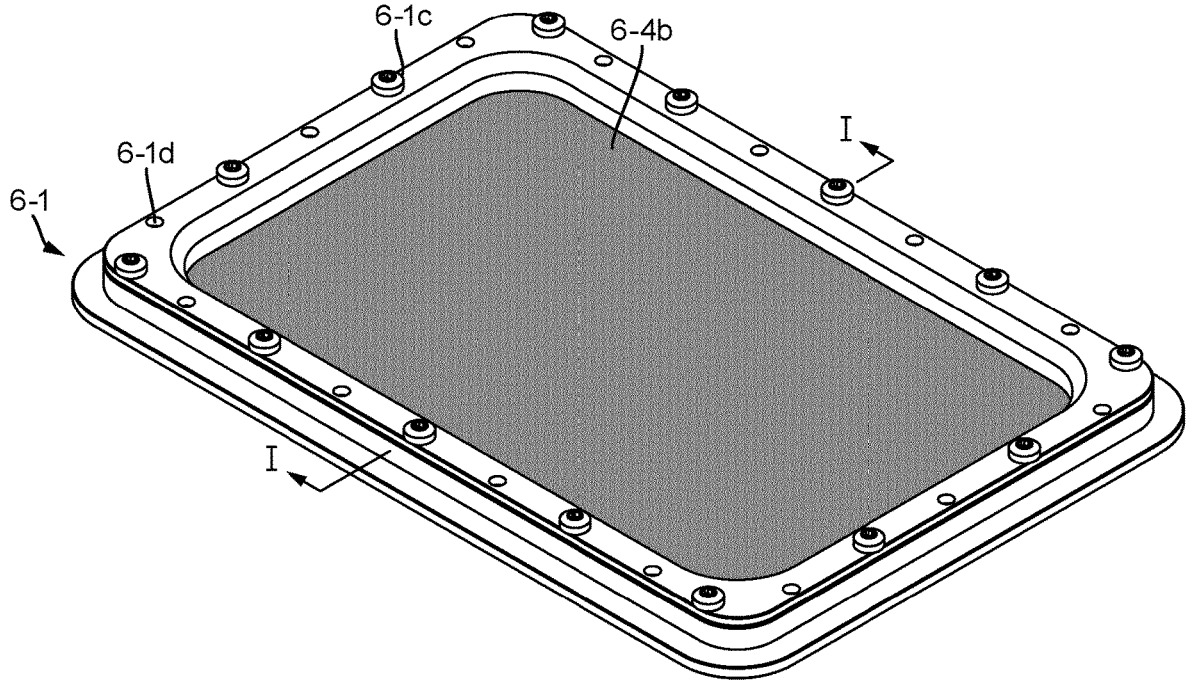
FIG. 6—is a schematic perspective bottom view of the inner frame in FIG. 4.
Figure 7:
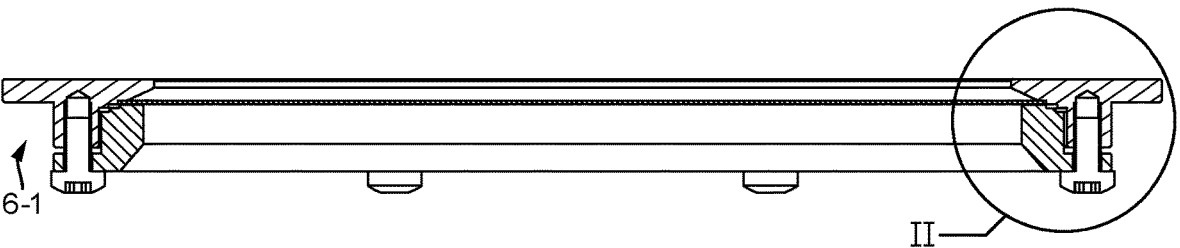
FIG. 7—is a schematic cross-sectional view of the inner frame in FIG. 6, taken along the line I-I.
Figure 8:
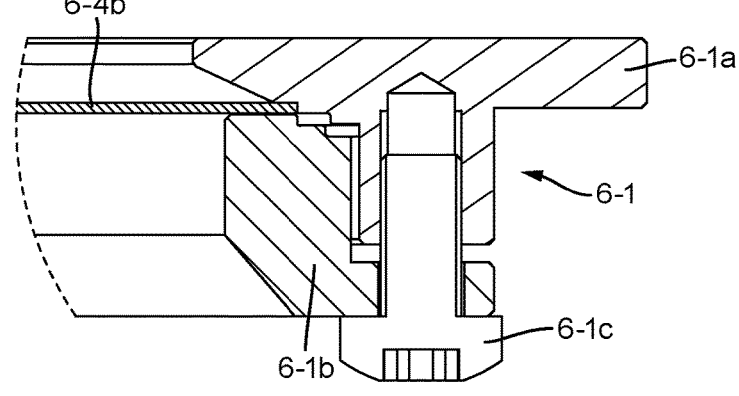
FIG. 8—is a schematic enlarged view of the detail II in FIG. 7.
Figure 9:
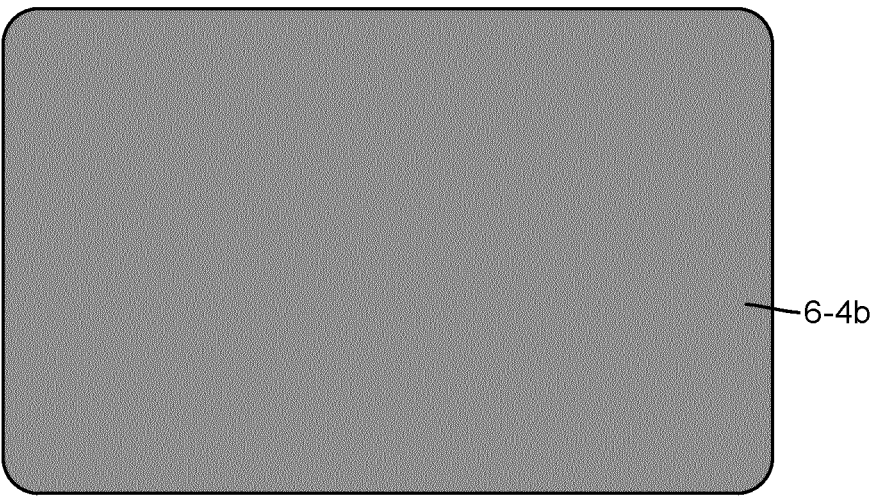
FIG. 9—is a schematic bottom view of a UV-transparent anti-adhesive flexible foil with a frosted lower surface.

Hereinafter, the frame assembly (6) will be explained in more detail. As shown in FIG. 4, the frame assembly (6) comprises an inner frame (6-1) and an outer frame (6-2) which are respectively mounted on the inner side and the outer side of the aperture (4*a*) of the resin vat unit (3). A sealing (6-3) is preferably arranged between the interface of the inner frame (6-1) and the resin vat unit (3). Another sealing (6-3) is preferably arranged between the interface of the inner frame (6-1) and the outer frame (6-2). As shown in FIG. 8, the inner frame (6-1) has two inner frame elements (6-1*a*; 6-1*b*) which are attached to each other through the screws (6-1*c*). As shown in more detail in FIG. 8, the UV-transparent anti-adhesive flexible foil (6-4*b*) can be mounted by means of the frame assembly (6). The UV-transparent anti-adhesive flexible foil (6-4*b*) is sandwiched/clamped between the two inner frame elements (6-1*a*; 6-1*b*). The screws (6-1*c*) can be easily removed by the user to exchange the removable UV-transparent anti-adhesive flexible foil (6-4*b*). FIG. 9 shows the UV-transparent anti-adhesive flexible foil (6-4*b*) whose lower surface has been frosted. Compared to a transparent foil (6-4*b'*), the frosted foil (6-4*b*) in FIG. 9 looks milky, and has preferably a smooth upper surface to enable easy peeling off. Alternatively, the foil (6-4*b*) may be entirely smooth on both sides but have a milky optical appearance to achieve smoothening. As shown in FIG. 4, the UV-transparent window (6-4) has air holes (6-2*a*) for communicating the interface between the UV-transparent anti-adhesive flexible foil (6-4*b*) and the UV-transparent plate (6-4*a*) with the atmosphere for more easily enabling the peeling-off process during the layerwise printing. As shown in FIG. 4, the UV-transparent plate (6-4*a*) is fixed on the outer frame (6-2) for example with an adhesive, alternatively it can be detachably seated on a sealing (not shown). The outer frame (6-2) has an air hole (6-2*a*) at each corner which are preferably connected with each other through a peripherally running air channel (6-2*b*). The air hole (6-2*a*) is preferably connected through a hose (6-2*c*) with the atmosphere. The outer frame (6-2) has screw holes (6-2*e*) for letting through the screws (6-2*d*) which are screwed into screw holes (6-1*d*) (see FIG.

6). The outer frame (6-2) has also screw holes (6-2*e'*) for letting through the screws (6-2*d'*) which are screwed into screw holes (not shown) on the outer side of the resin vat unit (3). In the assembled state, the UV-transparent anti-adhesive flexible foil (6-4*b*) and the UV-transparent plate (6-4*a*) are stacked on each other and thereby together define the UV-transparent window (6-4*a*). Optionally, a frame-like spacer foil with a desired thickness (not shown), preferably 100 micrometers, can be arranged between them to secure more space for enabling an easier peeling off. The weight of the photocurable resin (5) in the resin vat unit (3) would cause a deflection of the UV-transparent anti-adhesive flexible foil (6-4*b*). The screws (6-2*d*) can be used also to adjust the tension on the said flexible foil (6-4*b*) when the inner frame (6-1) is clamped to the outer frame (6-2) with the elastic sealing (6-3) located in-between. The tighter the screws (6-2*d*) are fixed, the higher becomes the tension on the flexible foil (6-4*b*). As the screws (6-2*d*) are tightened, the UV-transparent anti-adhesive flexible foil (6-4*b*) is stretched across the UV-transparent plate (6-4*a*) and accordingly pressed against the latter due to the relative movement of the inner frame (6-1) towards the outer frame (6-2).

In an embodiment, the reservoir (4) and the frame assembly (6) including the UV-transparent window (6-4) are configured to define a detachable resin vat unit (3) which can be entirely detached through a user and taken manually out of the additive manufacturing apparatus (1). The UV-transparent plate (6-4*a*) can be also separately provided from the resin vat unit (3) so that the frame assembly (6) holds only the UV-transparent anti-adhesive flexible foil (6-4*b*). In such embodiment (not shown) the UV-transparent plate (6-4*a*) can be mounted into the chassis of the additive manufacturing apparatus (1) below the detachable resin vat unit (3). In this embodiment, the resin vat unit (3) preferably has a hand grip (4*b*) as shown in FIG. 3. The user can detach the resin vat unit (3) and retrofit the resin vat unit (3) by means of the frame assembly (6) with any desired UV-transparent anti-adhesive flexible foil (6-4*b*) or UV-transparent plate (6-4*a*) having the optical means (5) for diffusing the projected UV light.

In an embodiment, the detachable resin vat unit (3) preferably has an RFID tag (not shown) that includes information on the presence/absence of the said optical means (6-5) in the UV-transparent window (6-4). In this embodiment, the additive manufacturing apparatus has a corresponding RFID reader/writer (not shown) to recognize the type of resin vat unit (3) and update any information stored therein. The additive manufacturing apparatus (1) has also a control panel (not shown), preferably with a GUI for guiding the user.

Figure 10A:
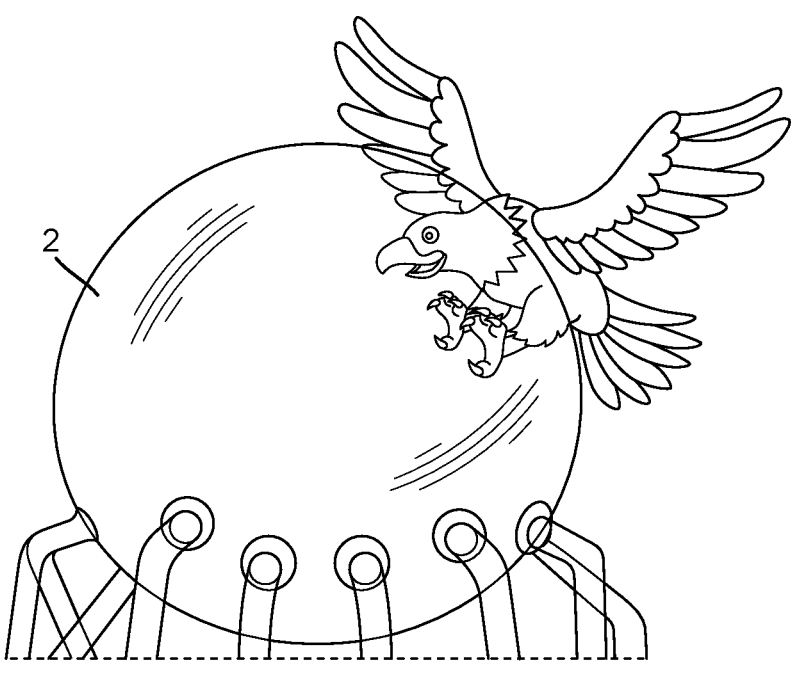
FIG. 10A—is a schematic view of a 3D component printed with translucent photocurable resin through the additive manufacturing apparatus according to an embodiment.
Figure 10B:
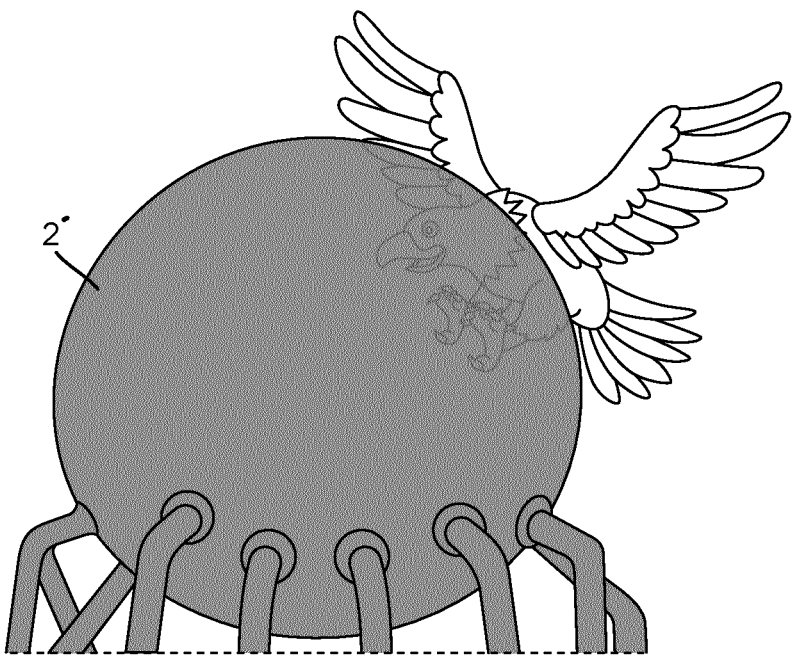
FIG. 10B—is a schematic view of a 3D component printed with translucent photocurable resin through the additive manufacturing apparatus according to the prior art.

FIG. 10A illustrates an embodiment in which a 3D component (2) has been printed using a transparent photocurable resin through an additive manufacturing apparatus of the present invention. In this embodiment the 3D component (2) has not been subjected to any mechanical surface treatment. It can be seen in FIG. 10A that the 3D component (2) has a high transparency because of the smooth surface, and the eagle in the background can be clearly seen in contrast to the prior art in FIG. 10B.

Figure 11A:
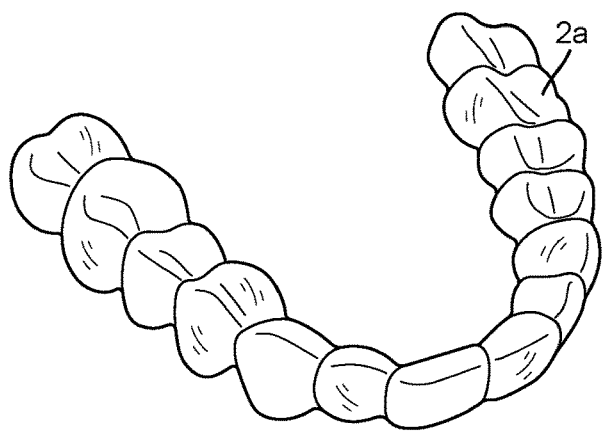
FIG. 11A—is a schematic view of a clear aligner printed with translucent photocurable resin through the additive manufacturing apparatus according to an embodiment.
Figure 11B:
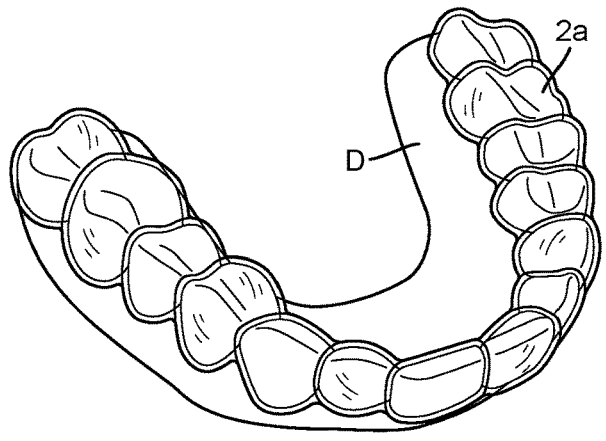
FIG. 11B—is a schematic view of the clear aligner in FIG. 11A placed on a denture model.
Figure 11C:
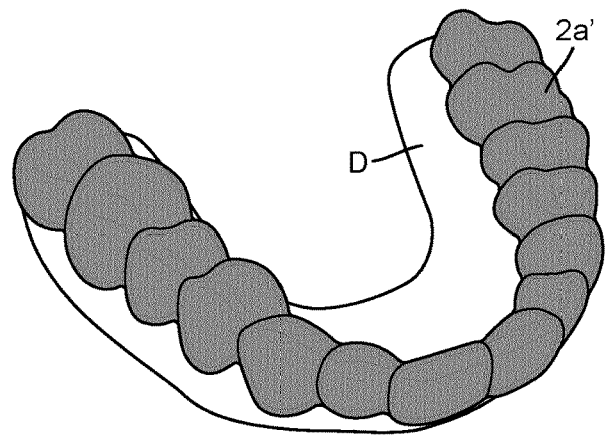
FIG. 11C—is a schematic view of an aligner printed with transparent photocurable resin through an additive manufacturing apparatus according to the prior art, and placed on a denture model.

FIG. 11A and FIG. 11B illustrate another embodiment in which a dental aligner (2*a*) has been printed using a transparent photocurable resin through an additive manufacturing apparatus according to the present invention. Also, in this embodiment the aligner (2*a*) has not been subjected to any mechanical surface treatment and has been placed on a denture model (D). The denture model (D) has a gingiva part and teeth. It can be seen in FIG. 11B that the aligner (2*a*) has a high transparency because of its smooth surface, and the teeth can be clearly seen through the aligner (2a) in contrast to the prior art in FIG. 11C.

In a preferred embodiment, the UV-transparent anti-adhesive flexible foil (6-4b) hereinafter shortly referred to as foil (6-4b)) is only frosted at its lower side facing the projection unit (7). The upper side of the said foil (6-4b) facing the interior of reservoir (4) and contacting the UV light photocurable resin (5) is smooth (not frosted). And the said foil (6-4b) has no admixed light diffusing particles. Alternatively, light diffusing particles may be admixed during its manufacture. The said foil (6-4b) can be manufactured from any of the following plastic materials: Fluor polymers such as Fluorinated ethylene propylene (FEP), Polytetrafluoroethylene (PTFE), Ethylene Tetrafluoroethylene (ETFE), Perfluoralkoxy-Polymer (PFA), Teflon AF™, Polyvinyl fluoride (PVF), Polyvinylidene fluoride (PVDF). This list is not exhaustive. The upper side of the UV-transparent plate (6-4a) (hereinafter shortly referred to as plate (6-4a)) averted from the projection unit (7) is smooth. Alternatively, its upper side may also be frosted or roughened (e.g., by etching). The lower side of the plate (6-4a) is also smooth. And the plate (6-4a) has no admixed light diffusing particles. The plate (6-4a) may be a float glass (white glass), which is specified with a light transmission of >89% at 385 nm. The foil (6-4b) is directly disposed on the plate (6-4a) on the side averted from the projection unit (7). The foil (6-4b) immediately rests on the plate (6-4a) which prevents sagging of the foil (6-4b). The printing surface is thereby maintained straight. Alternatively, a separate UV light diffusing/scattering foil (not shown) can be placed in between the foil (6-4b) and the plate (6-4a) which will be described later. Moreover, the plate (6-4a) prevents the foil (6-4b) from being damaged/disrupted from an underside of the resin vat unit (3) during mounting/unmounting or transportation by the user. Any of the above-mentioned frosted surfaces can be obtained by mechanical or chemical post processes such as sand blasting or chemical etching. Alternatively, any of the above-mentioned frosted surfaces can be obtained during the molding process where the mold has a frosted/rough surface. The degree of roughness (frost level) of the frosted surface is process adjustable in accordance with the desired smoothing effect. The above-mentioned light diffusing particles may be achieved by admixing calcium phosphate, fluorides, tin oxide, ash or the like in suitable low concentrations. The foil (6-4b) with the admixture has a milky optical appearance. Alternatively, UV scattering nanoparticles e.g., TiO2 may be used. UV scattering nanoparticles may alternatively or additionally be dispersed in the resin (5) at suitable concentrations.

In this preferred embodiment, the resin vat unit (3) can be detached by a user by means of detachment mechanism, including a receptacle for receiving the resin vat unit (3) and a latch for locking/unlocking the resin vat unit (3). The detachable resin vat unit (3) preferably comprises an RFID tag that includes information on the type of the resin vat unit (3), and information on the presence/absence of the said optical means (6-5) in the UV-transparent window (6-4), in particular information indicative of the UV light diffusing/scattering level that can be used to determine achievable smoothness level, and the amount of UV-light to be compensated during the exposure. In addition, the additive manufacturing apparatus (1) is provided with an RFID reader/writer. Thereby the additive manufacturing apparatus (1) can recognize the type of the attached resin vat unit (3), the type of the said optical means (6-5), e.g., whether it comprises a frosted/milky foil (6-4b) or not, retrieve said information on the foil (6-4b), and optionally display to the user the above-mentioned information via the user interface of the additive manufacturing apparatus (1), and the control unit can apply the required printing mode based on such information. The information stored by the RFID tag can also include additional information which will be explained later. The control unit is adapted to perform the control in accordance with such information read from the RFID tag. The information may be indicative of at least an amount of light to be compensated due to the diffusion of the projected UV light (8) caused by the said optical means (6-5). For example, the frosted/milky foil (6-4b) depending on the degree of roughness, and/or the mixed light diffusing particles depending on the concentration can lead to an amount of 50% loss of exposure light. The smoothening effect of the component (2) can be improved when the diffusing/scattering of the projected UV light (8) additionally induced by the optical means (5) is increased to cause at least 3% loss of exposure light (projected UV light (8)), more preferably at least 3%-50%, and even more preferably 10%-25% loss of exposure light compared relative to the exposure light set for normal printing conditions. Herein the normal printing conditions may involve that the upper surface of the plate (6-ba) or the lower surface of the foil (6-4a) is very slightly roughened (without becoming milky) to achieve improved peeling off, which however does not create any observable smoothing of the component (2). The control is implemented through a software. The control unit can compensate for the light amount to be applied by the projection unit (7) during layer-wise curing, that is lost by the diffusing/scattering effect of the frost and/or admixture. Thus, the light amount is accordingly adjusted, i.e., increased or decreased. The control unit may prompt the user via the user interface to mount a foil (6-4b) with a specific frost level and/or admixture that suits the printing job, in particular the desired smoothness of the component (2) to be printed, and further accordingly adapt the light amount to be applied by the projection unit (7).

The resin vat unit (3) may be provided with a detachable replenishment cartridge (not shown) including a specific UV-light photocurable resin (5) for replenishing the reservoir (4). One or more RFID tags may be provided on the wall of the reservoir (4) and/or directly on the replenishment cartridge. The RFID tag may also include information on the specific UV-light photocurable resin (5). Thereby, different UV-light photocurable resin (5) may be recognized and used by the additive manufacturing apparatus (1) for different dental applications. The control unit is adapted to perform the control in accordance with type of the UV-light photocurable resin (5) recognized and the exposure requirements.

The user can also edit the RFID tag via a user interface of the additive manufacturing apparatus (1) in accordance with any changes made to the resin vat unit (3), for example, after retrofitting or exchanging the foil (6-4b) with a different one, or any other components or consumables such as UV light photocurable resin (5).

Instead of the above-mentioned RFID tags or in addition thereto, barcode labels or QR code labels or the like can be used on the resin vat unit (3) that store the information. Instead of the above-mentioned RFID reader/writer or in addition thereto, an optical reader unit such as scanner (camera/barcode reader etc.) can be used. Alternatively, or additionally a mobile phone camera or an intraoral scanner connectable to the system comprising the additive manufacturing apparatus (1) can be used.

Before the printing process is started, the information is acquired automatically via the RFID tags and/or labels, however, the user may optionally manually enter via the user interface, the type of the resin vat unit (3) attached, and specifically any of the above-mentioned information regarding frost/admixture level, type of consumables and the like. The control unit also manages a usage history of the resin vat unit (3) to monitor wear of the foil (6-4b) and the like. The data relating to the usage history and/or other look up tables for decoding the information can be maintained in a data storage of the additive manufacturing apparatus (1) and/or in a data storage in the cloud or the like. The additive manufacturing apparatus (1) is connectable to the internet and/or local area network for receiving/sending data relating to printing jobs. This information can be also retrieved/updated by other additive manufacturing apparatus (1) connectable to each other directly or via a network.

A removable, exchangeable frame-like spacer foil (not shown) with a desired thickness, preferably 100 micrometers or more, may optionally be arranged between the foil (6-4b) and the plate (6-4a) to secure more space such as air gap for enabling an easier peeling off. The said gap is preferably open to the atmosphere. The frame-like spacer foil can be manufactured for example from any of the following plastic materials: Plastic polymers such as Polyethylene (PE), Polypropylene (PP), Polymethylmethacrylate (PMMA), Polyvinylchloride (PVC), Polycarbonate (PC). The frame-like spacer foil can be also manufactured from metal, ceramic, or paper. The metal materials can be metals such as aluminum, aluminum based alloys, copper based alloys, stainless steel. The ceramic materials can be ceramics such as alumina, zirconia, silicon carbide, silicon nitride.

The foil (6-4b) has preferably a rectangular area of about 107.7×166.5 mm, and preferably a thickness of 0.127 mm. But foils (6-4b) with different dimensions that are larger or smaller may be used. The removable frame-like spacer foil is preferably provided with a thickness of at least 100 micrometers. Thereby, the specific pull-off forces can be reduced below 30N by a 60% area utilization of the available projection foil area of about 134.4 mm×75.6 mm, which is suitable for dental applications such as aligners, bite splints, models, drilling templates, dentures, and the like. Different area utilization that is larger or smaller may be used. If the utilization of the available projection foil area is even smaller, the removable frame-like spacer foil can be preferably provided with a smaller thickness of at least 50 micrometers. A smaller height would not adequately meet the peel off requirements. Therefore, the said thickness is preferably in the range of 50-150 μm, more preferably in the range of 150-200 μm, or even more preferably at least 200 μm. The removable frame-like spacer foil (6-4c) has preferably a rectangular shaped opening in the middle thereof to secure the air gap in the assembled state. The foil (6-4b) has preferably the same outer contour with the removable frame-like spacer foil. The surrounding frame-width of the removable frame-like spacer foil is preferably about 13 mm, and has preferably also rounded corners. Different widths may be used. The removable frame-like spacer foil can be made of the same material of the UV-transparent anti-adhesive flexible foil (6-4b). Alternatively, the removable frame-like spacer foil can be preferably produced from different materials such as plastic, metal, ceramic, or paper in the form of thin sheets.

Furthermore, the removable frame-like spacer foil and/or the foil (6-4b) may be provided with different color codes (color markings) which are visible from the outside, and can allow the user to distinguish between different sizes, thicknesses, materials, roughness and/or admixture levels thereof. Hereto, the user may refer to a look-up table in a user manual or the user interface of the additive manufacturing apparatus (1) regarding the color codes. The additive manufacturing apparatus (1) has a data storage storing such information or may retrieve them from an external data storage, preferably in the cloud.

The RFID tags or labels may also include information on the presence/absence of the removable frame-like spacer foil in the UV-transparent window (6-4). In addition, any combination of information on the thickness, size, material, and/or color of the removable frame-like spacer foil (6-4c) can also be saved in the RFID tag.

The control unit may prompt the user via the user interface to mount a spacer foil (6-4c) with a required/sufficient minimum thickness that suits the printing job, in particular the area utilization, and further accordingly adapt the peeling forces to be applied by the transport unit.

The present invention also provides a method of additive manufacturing of a component (2), by using the additive manufacturing apparatus (1) of the present invention, in particular by using the said optical means (6-5) of the detachable resin vat unit (3) to diffuse/scatter the projected UV light (8) and smoothen the component (2) surface, wherein the control unit compensates for the light amount to be applied by the projection unit (7) during layer-wise curing, due to the light lost by the diffusion/scattering effect.

After the exposure process, the resin (5) is cured on the exposed surface layer and adheres to the upper surface of the foil (6-4b) and the movable building platform (9)/the component (2). The foil (6-4b) must be preferably smooth on the upper surface so that the cured resin (5) can be separated/peeled off from the foil (6-4b) as easily as possible through the transportation unit. This results in, lower peel-off forces, which provide greater component accuracy and longer hardware life, and also accelerated manufacturing.

The foil (6-4b) is preferably rough on the underside so that (i) air can flow more easily between the foil (6-4b) and the plate (6-4a), and (ii) a scattering effect is achieved through the roughness and optically milky structure. This scattering effect provides a smooth surface for the component (2), namely the printed body. To further ensure accuracy, the scattering effect should preferably occur as close to the resin (5) as possible. Therefore, the foil (6-4b) is preferably frosted on the lower side. Alternatively, or additionally the volume inside the foil (6-4b) can be provided with light diffusing particles. The resin vat unit (3) is preferably replaceable. This is particularly advantageous because if it wears out or if a different resin material is to be printed, the resin vat unit (3) can be removed and replaced by another one or retrofitted accordingly. The RFID tag is advantageous to uniquely register the resin vat unit (3) and to document wear. This allows (i) confusion to be avoided and (ii) information on the resin vat unit (3) and the foil (6-4b) used to be recognized. This ensures that the correct process parameters (e.g., exposure time and individual over/undersize correction) can be set and thus the printed body can be produced as desired. In addition, (iii) the resin vat unit (3) and the printing jobs performed, and the wear can be documented as usage history. Use of the hardware beyond the defined/permitted run time can thus be prohibited.

In an embodiment, a configuration consisting of transparent glass plate (6-4a) which is smooth on both sides, a separate diffusing/scattering foil (not shown) roughened at least on one of the upper and lower sides and/or admixed with light diffusing/scattering particles, and a transparent foil (6-4b) smooth on both sides (arranged in the given order along the light path from the projecting unit (7) towards the resin (5) can be used. The separate diffusing/scattering foil is preferably removably attached to the resin vat unit (3) and sandwiched between the plate (6-4a) and foil (6-4b).

By virtue of the present invention "easy peeling off", "protection of the upper side of the foil (6-4b) from resin stain" and "light diffusion/scattering for smoothening the component surface" can be effectively achieved.

The invention claimed is:

1. An additive manufacturing apparatus for additively manufacturing a component, comprising:

a resin vat unit which comprises: a reservoir for storing UV light photocurable resin; and a UV-transparent window at the bottom of the reservoir, wherein said UV-transparent window includes a UV-transparent plate and a UV-transparent anti-adhesive flexible foil;

a projection unit for projecting UV light through the UV-transparent window into the reservoir;

a movable building platform having a surface onto which said component can be formed through layerwise curing of said resin;

wherein the UV-transparent window further comprises:

an optical means which is adapted to diffuse the projected UV light towards the building platform into a region where the UV light photocurable resin is to be layerwise cured, wherein the optical means is arranged in the light path of the projected UV light, wherein the UV-transparent anti-adhesive flexible foil includes light diffusing particles, and the optical means is realized through said light diffusing particles inside the UV-transparent anti-adhesive flexible foil.

2. The additive manufacturing apparatus according to claim 1, wherein the optical means further comprises a matrix of light diffusing microlenses.

3. The additive manufacturing apparatus according to claim 1, wherein the reservoir and the UV-transparent window are configured to define a detachable resin vat unit which is detachable through a user from the additive manufacturing apparatus.

4. The additive manufacturing apparatus according to claim 3, further comprising an RFID reader/writer, and wherein the detachable resin vat unit comprises an RFID tag that includes information on the presence/absence of the optical means in the UV-transparent window.

5. The additive manufacturing apparatus according to claim 1, wherein said UV-transparent anti-adhesive flexible foil is removably mounted to the resin vat unit.

6. A UV-transparent anti-adhesive flexible foil configured for use in an additive manufacturing apparatus, the UV-transparent anti-adhesive flexible foil comprising an upper surface and a lower surface, wherein at least one of the upper surface and the lower surface of the UV-transparent anti-adhesive flexible foil includes light diffusing particles.

* * * * *